Oct. 13, 1959 G. ALFIERI 2,908,364
DEVICE FOR AUTOMATIC CONTROL OF FRICTION
CLUTCH IN AUTOMOTIVE VEHICLE
Filed Feb. 5, 1954 2 Sheets-Sheet 1

INVENTOR
GIUSEPPE ALFIERI
BY
ATTORNEY

INVENTOR
GIUSEPPE ALFIERI
BY
ATTORNEY

United States Patent Office 2,908,364
Patented Oct. 13, 1959

2,908,364

DEVICE FOR AUTOMATIC CONTROL OF FRICTION CLUTCH IN AUTOMOTIVE VEHICLE

Giuseppe Alfieri, Milan, Italy, assignor to Fabbrica Italiana Magneti Marelli, Milan, Italy Application February 5, 1954, Serial No. 408,514

Claims priority, application Italy March 17, 1953

2 Claims. (Cl. 192—3.5)

In existing automotive vehicles, the friction clutch is usually controlled by means of a mechanical transmission which is actuated by a pedal operated by the driver.

It is an object of the invention to facilitate operation of the clutch, particularly in the case of very heavy automotive vehicles.

In accordance with an aspect of the invention, a system for controlling the friction clutch employs a pneumatic operating device actuated by the usual clutch pedal existing in the automotive vehicle, and such device comprises a compressed air distributor actuated by means of a lever system connected to the clutch pedal. The compressed air distributor controls the feeding of compressed air to a cylinder having a plunger reciprocable therein to effect the engagement and disengagement of the friction clutch so that the force required for disengaging the clutch is provided by the action of the compressed air against the plunger, while the driver applies only a relatively small force to the clutch pedal for the purpose of actuating the compressed air distributor. The clutch operating cylinder supplied with compressed air from the distributor is further provided with an electric switch adapted for connection in an electric circuit and which is closed only following the movement of the plunger corresponding to disengagement of the clutch so that the control of other devices which are electrically operated can be subordinated to the disengagement of the friction clutch, as in the case of the control of the change-speed gear in automotive vehicles described in my co-pending application identified as Serial No. 405,923, filed January 25, 1954, and which has issued as United States Letters Patent No. 2,795,963.

The above, and other objects, features and advantages of the invention, will be apparent in the following detailed description of an illustrative embodiment thereof which is to be read in connection with the accompanying drawings forming a part hereof, and wherein.

Figure 3:
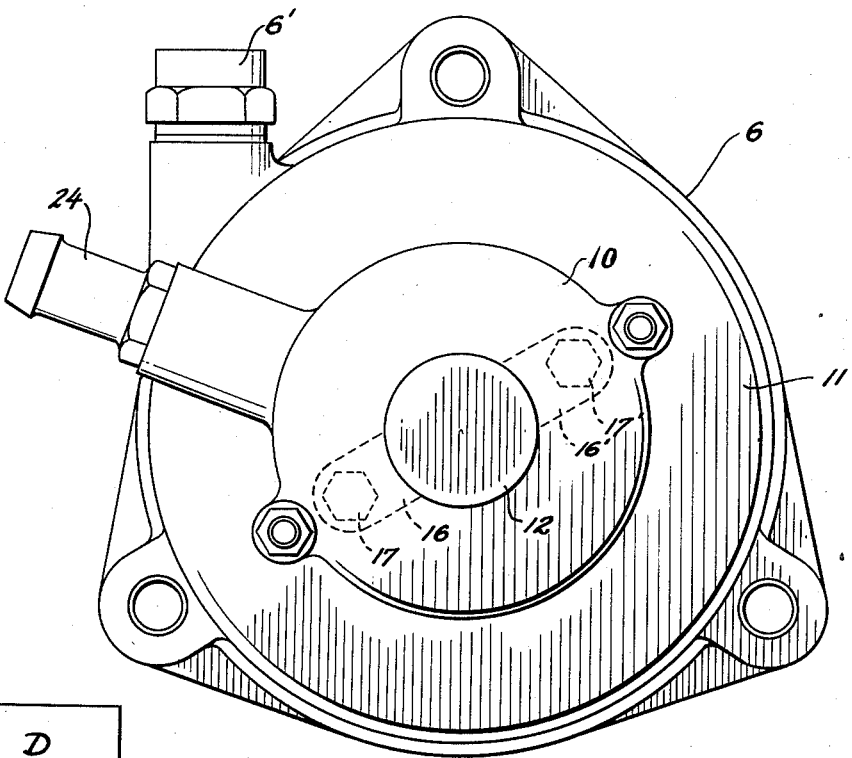
Fig. 3 is a front elevational view of the cylinder of Fig. 2.
Figure 1:
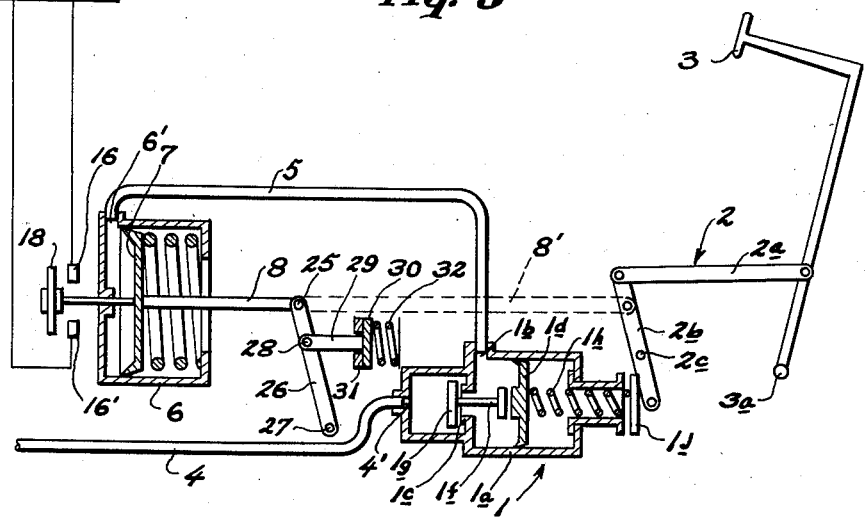
Fig. 1 is a diagrammatic view of a clutch operating system embodying the present invention.

Referring to the drawings in detail, and initially to Fig. 1 thereof, it will be seen that a clutch operating system embodying this invention includes a clutch pedal 3 pivoted at 3a and intended to be actuated by the operator of the automotive vehicle. The pedal 3 actuates a mechanical assembly, generally identified by the reference numeral 2, and made up of a link 2a and a compound lever 2b which is pivotally mounted intermediate its ends, as at 2c. The opposite ends of the link 2a are pivotally connected to the pedal 3 and to one end of the lever 2b, respectively, so that the rocking of the pedal is communicated to lever 2b.

The clutch operating system further includes a valve or distributor for compressed air which is generally identified by the reference numeral 1. The distributor 1 comprises a housing 1a having an inlet 4' for compressed air and an outlet 1b for compressed air, with a valve seat 1c being provided between the inlet 4' and the outlet 1b. A piston 1d is reciprocable within a cylindrical portion 1e of the housing 1a and is engageable with a stem 1f of a valve member 1g which cooperates with the seat 1c and is urged against the latter by the pressure of compressed air supplied to the inlet 4'. When the piston 1d moves toward the left, as viewed in Fig. 1, it engages valve stem 1f and moves the valve member 1g away from the seat 1c to thereby permit compressed air to flow from the inlet 4' into the cylinder 1e and from the latter out of the outlet 1b.

A spring 1h acts, at one end, against the piston 1d and urges the latter toward the left, as viewed in Fig. 1, that is, in the direction for opening the valve member 1g, and the other end of the spring 1h is engaged by a movable abutment 1j, which, in turn, is engageable by the free end of the lever 2b. When the pedal 3 is depressed, the spring 1h is compressed and urges the piston 1d in the valve opening direction, so that compressed air, upon entering the cylinder 1e for exhaust through the outlet 1b, then acts against the piston 1d in the direction opposed to the action of the spring 1h, whereby the piston 1d is moved toward the right away from the valve stem 1f when the pressure of air in cylinder 1e exerts a force against the piston 1d which is greater than the force of the spring 1h. When the piston 1d is moved toward the right away from the valve stem 1f, the pressure of the compressed air supplied to the inlet 4' and acting against the valve 1g can seat the latter. Thus, the pressure of air discharged through the outlet 1b is proportional to the force of spring 1h, which force is, in turn, determined by the displacement of the pedal 3 and, through the mechanical assembly 2, by the displacement of abutment 1j.

A conduit 4 extends from a source of compressed air (not shown) to the inlet 4', while the outlet 1b is connected to a conduit 5 extending from the distributor 1 to the inlet of an operating cylinder 6 having a plunger or piston 7 reciprocable therein and connected to a piston rod 8.

The rod 8 has a fork 9 at one end which is connected to suitable mechanical transmission means for engaging and disengaging the usual friction clutch. Thus, as shown in Fig. 1, the fork 9 of rod 8 is pivotally connected, as at 25, to one end of a lever 26 which is pivotally mounted at 27. Further, a link 29 is pivotally connected at one end, as at 28, to the lever 26 and, at its other end, to the axially movable plate 30 of a friction clutch which also has an axially fixed plate 31. A spring 32 may also be provided to assist the spring in cylinder 6 in urging plate 30 against plate 31. It will be apparent that, when plunger 7 is moved toward the left, as viewed in Fig. 1, plate 30 is moved away from plate 31 to disengage the friction clutch.

Figure 2:
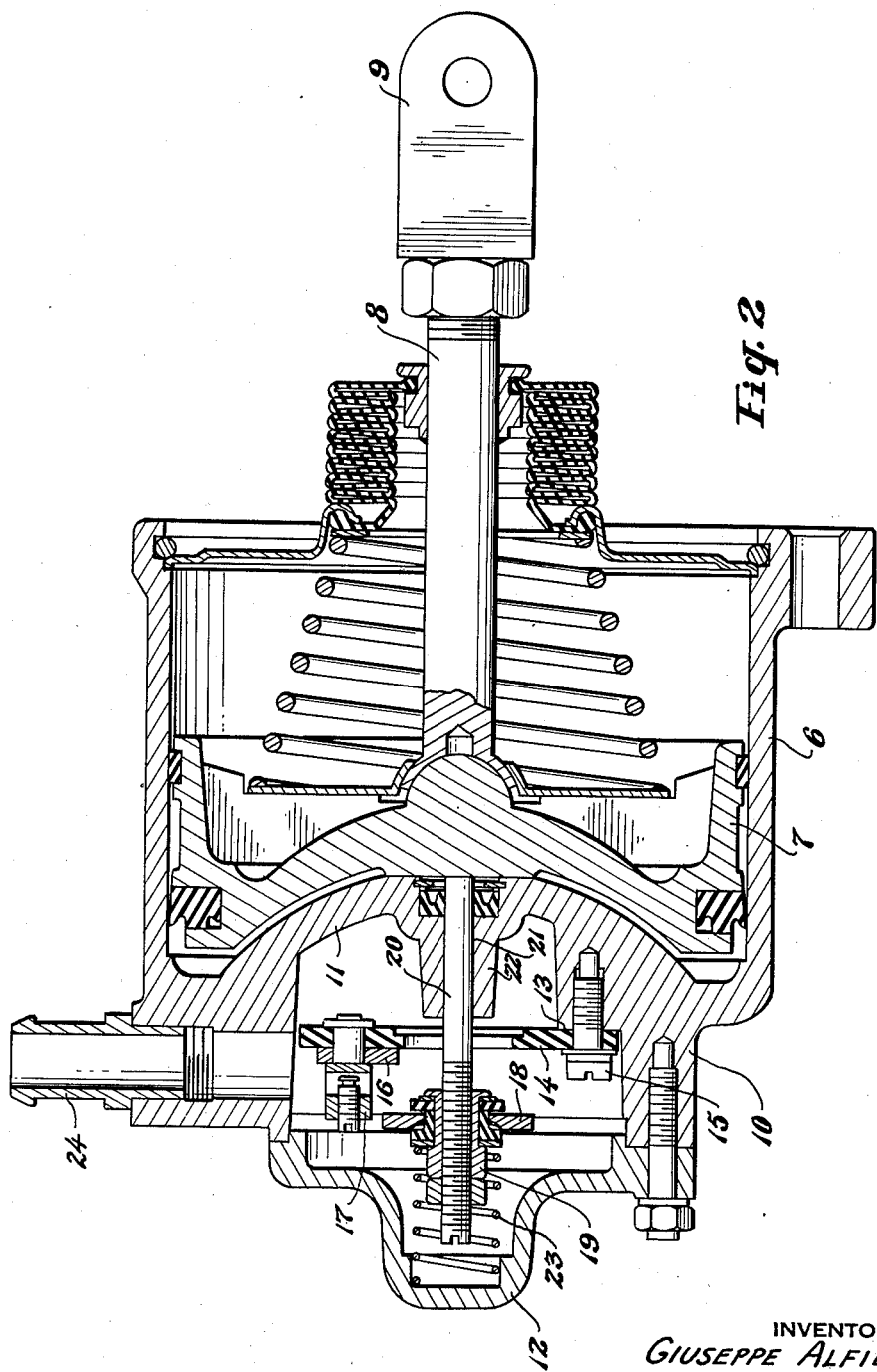
Fig. 2 is an axial sectional view of the clutch operating cylinder included in the system of Fig. 1.

As shown in Fig. 2, the head of the cylinder 6 is provided with an external box 10 formed by a concave end wall 11 of the cylinder head and by a cover 12. The end wall 11 of the cylinder head is shaped to form a seat 13 on which an insulating plate 14 is secured by means of bolts 15, and the plate 14 carries small contact plates 16 and 16' (Fig. 1) which are connected to terminals 17 and 17'. A movable contact 18 is adjustably supported by means of a sleeve 19 threaded on a rod 20 which is axially slidable in a bore 21 extending through a central boss 22 formed on the wall 11 of cylinder 6 and opening into the latter. A suitable seal is provided around the rod 20 where the latter passes through end wall 11. The rod 20 is urged axially into contact with the plunger 7 by means of a compression spring 23 which abuts against the cover 12. When the plunger 7 undergoes its operative stroke, that is, when plunger 7 is moved away from end wall 11 under the influence of compressed air admitted to cylinder 6, the rod 20 moves increasingly into the interior of the cylinder 6 by reason of the action of the spring 23 and thus permits the movable contact 18 to engage the contact plates 16 and 16'. Conversely, when the plunger 7 is returned toward end wall 11, the movable contact 18 is disengaged from the fixed contact plates 16 and 16'.

The box 10 carries a coupling or connector 24 for receiving one end of an electric cable to be connected to the terminals 17 and 17' and forming part of the electric control circuit of a device represented by the block D which controls the change-speed gear transmission of the associated motor vehicle, for example, as shown in my United States Letters Patent No. 2,795,963. Thus, the device for controlling the change-speed gear transmission can be operated to effect a change of gear ratio only during engagement of the clutch, that is, when movable contact 18 engages fixed contact plates 16 and 16'.

In the above described clutch operating system, the operating cylinder 6 preferably merely assists the usual mechanical control of the friction clutch. Thus, as shown in Fig. 1, the rod 8 of the plunger 7 in cylinder 6 is also connected directly, as by a link 8' shown in dotted lines, to the lever 2b so that the mechanical control transmission as well as the compressed air distributor 1 are actuated simultaneously by the pedal 3.

Alternatively, the operating cylinder 6 may form the sole means for actuating the friction clutch, and, in this case, it is only necessary to eliminate the link 8'.

Although an illustrative embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

What I claim is:

1. In a motor vehicle having electrically operated means for controlling the change-speed gear transmission thereof, a friction clutch and a pedal for actuation by the operator of the vehicle to disengage the clutch; the combination of a device for controlling the engagement and disengagement of the clutch in response to movements of the pedal; said device comprising a cylinder having a plunger reciprocable therein and a head closing one end of the cylinder, means for connecting said plunger to the clutch so that displacement of the plunger in one direction acts to disengage the clutch while the return movement of the plunger acts to engage the clutch, spring means within said cylinder acting against said plunger to effect the return movement of the latter, means for conveying fluid under pressure to said cylinder to act within the latter against said plunger at the side of the latter to cause its displacement in said one direction, a valve in said fluid conveying means normally urged to a closed position by the fluid under pressure from said source so that the action of said spring means on said plunger is dominant, and mechanical means actuable by the clutch pedal and opening said valve when the pedal is actuated in the direction for disengaging the clutch so that the fluid under pressure then supplied to said cylinder acts against said plunger to overcome the force of said spring means and thereby move said plunger in said one direction; means defining a hollow box on said head of the cylinder; electrical switch means in said hollow box and adapted to be interposed in an electric circuit for energizing the electrically operated means controlling the change-speed gear transmission, and operating means actuated by said plunger to open said switch means and thereby prevent energizing of the electrically operated means controlling the change-speed gear transmission in response to said return movement of said plunger, and to close said switch means for completing the electric energizing circuit of the electrically operated means controlling the change-speed gear transmission in response to displacement of said plunger in said one direction during disengagement of the clutch.

2. In a motor vehicle, the combination as in claim 1; wherein said head is disposed at the end of said cylinder toward which said plunger is urged by said spring means; and wherein said switch means includes two spaced apart fixed contacts mounted within said box and insulated from the latter and from each other, terminals connected to said fixed contacts, a movable contact adapted to bridge across said fixed contacts, a pin slidable coaxially with respect to said plunger and projecting through said head into said cylinder, means adjustably mounting said movable contact on said pin at the side of said fixed contacts facing away from said head and insulating said movable contact from said pin, and resilient means urging said pin axially in the direction into said cylinder for engaging said movable contact with said fixed contact, said plunger, when moved by said spring means to engage the clutch, being effective to push said pin in the direction of said cylinder thereby to space said movable contact from said fixed contacts.

References Cited in the file of this patent

UNITED STATES PATENTS

| | | |
|---|---|---|
| 1,133,206 | Welty | Mar. 23, 1915 |
| 1,823,590 | Christensen | Sept. 15, 1931 |
| 2,035,678 | Swift | Mar. 31, 1936 |
| 2,065,980 | Maybach | Dec. 29, 1936 |
| 2,141,678 | Andres | Dec. 27, 1938 |
| 2,200,013 | Sanford | May 7, 1940 |
| 2,256,440 | Meyer | Sept. 16, 1941 |
| 2,273,277 | Lenkhardt | Feb. 17, 1942 |
| 2,296,289 | Mayrath | Sept. 22, 1942 |